United States Patent [19]

Arazu et al.

[11] Patent Number: 4,615,012
[45] Date of Patent: Sep. 30, 1986

[54] METHOD OF GENERATING CHARACTER PATTERNS

[75] Inventors: Shuichi Arazu; Tadao Tamukai, both of Tamayama; Kyuichi Fujisawa, Tonan, all of Japan

[73] Assignee: Alps Electric Co., Ltd., Japan

[21] Appl. No.: 559,913

[22] Filed: Dec. 9, 1983

[30] Foreign Application Priority Data

Dec. 9, 1982 [JP] Japan .............................. 57-216211

[51] Int. Cl.[4] ...................... G06F 15/626; G06F 3/13
[52] U.S. Cl. .................................. 364/520; 340/739; 400/17; 178/23 R
[58] Field of Search ............................ 364/518-523, 364/855; 178/23, 30; 340/739-742, 736; 400/16-19; 346/40

[56] References Cited

U.S. PATENT DOCUMENTS

| | | |
|---|---|---|
| 3,047,851 | 7/1962 | Palmiter .......................... 340/739 X |
| 3,437,869 | 4/1969 | Cobb et al. ....................... 340/739 X |
| 3,444,319 | 5/1969 | Artzt et al. .............................. 178/30 |
| 3,603,967 | 9/1971 | Hauerbach ........................ 340/741 X |
| 3,711,849 | 1/1973 | Hasenbalg ............................ 340/736 |
| 3,735,389 | 5/1973 | Tarczy-Hornoch ................ 340/739 |
| 3,755,805 | 8/1973 | Dandrel et al. .................. 340/741 X |
| 4,150,902 | 4/1979 | Brescia ................................ 400/18 X |
| 4,257,042 | 3/1981 | Lindemann et al. ........... 340/736 X |
| 4,298,945 | 11/1981 | Kyte et al. ...................... 364/521 X |
| 4,311,998 | 1/1982 | Matherat .......................... 340/739 X |
| 4,331,995 | 5/1982 | Hansen ............................. 340/739 X |

*Primary Examiner*—Errol A. Krass
*Assistant Examiner*—Joseph L. Dixon
*Attorney, Agent, or Firm*—Guy W. Shoup

[57] ABSTRACT

A method of generating character patterns to be printed on a printer, wherein each character is divided into line segments in the X or Y axis direction or 45°-angle direction on the X/Y coordinates. Segments are processed in pairs of contiguous, linked lines. The method eliminates the need for storing positional data for the node of linked lines, whereby the capacity of memory for storing numerous complex character patterns can be saved.

6 Claims, 5 Drawing Figures

METHOD OF GENERATING CHARACTER PATTERNS

BACKGROUND OF THE INVENTION

The present invention relates to a method of generating character patterns and, more particularly, to a method of printing characters on a plotter or printer which prints characters by moving its pen in accordance with a control signal produced by a microprocessor or the like, wherein the amount of data necessary for printing the characters is reduced by a data compression method.

Generally, in printing characters in accordance with the control signals, each character is expressed as a group of straight lines or vectors, and, according to the conventional method, each straight line to be drawn needs two pieces of descriptive data, i.e., a start point and an end point. FIG. 1 shows a flowchart of the conventional method of generating character patterns, in which the coordinates of the start and end points for each straight line are read from a data table according to the ASCII code entered to the printer or plotter and the pen is moved to draw each segment of character in accordance with the two coordinates stored for each line. This prior art method, however, needs data for the start and end points of every straight line, thus using a large amount of data storage when printing a complex character, and therefore the number of character types handled by the printer or plotter is limited due to its finite memory capacity. In addition, handling a large amount of data results in a long processing time, which consequently reduces printing speed.

SUMMARY OF THE INVENTION

The present invention overcomes the foregoing prior art deficiencies, and one object of the invention is to provide a method of generating character patterns wherein even a complex character can be printed using less data than that required by the conventional method.

According to the present invention, two contiguous straight lines lined at their juncture in any of eight possible directions, i.e., upward, downward, rightward, leftward, and combinations thereof as shown in FIG. 2, can be expressed by two pieces of data for the extreme start and end points. More particularly, as shown in FIG. 3, for printing the character "2", for example, the conventional method needs data corresponding to the nodes of each straight line (points P0 through P6) in order to draw the character. Whereas, according to the inventive method of generating character patterns, the two linked lines, P0–P2 and P2–P3 can be drawn by designating the coordinates of just two points, P0 and P3, and similarly, linked lines P3–P4–P5 can be drawn by designating the coordinates of points P3 and P5, when the line starting at the start point is an inclined line and the line ending at the end point is a vertical or horizontal line.

DETAILED DESCRIPTION OF THE INVENTION

Figure 4:
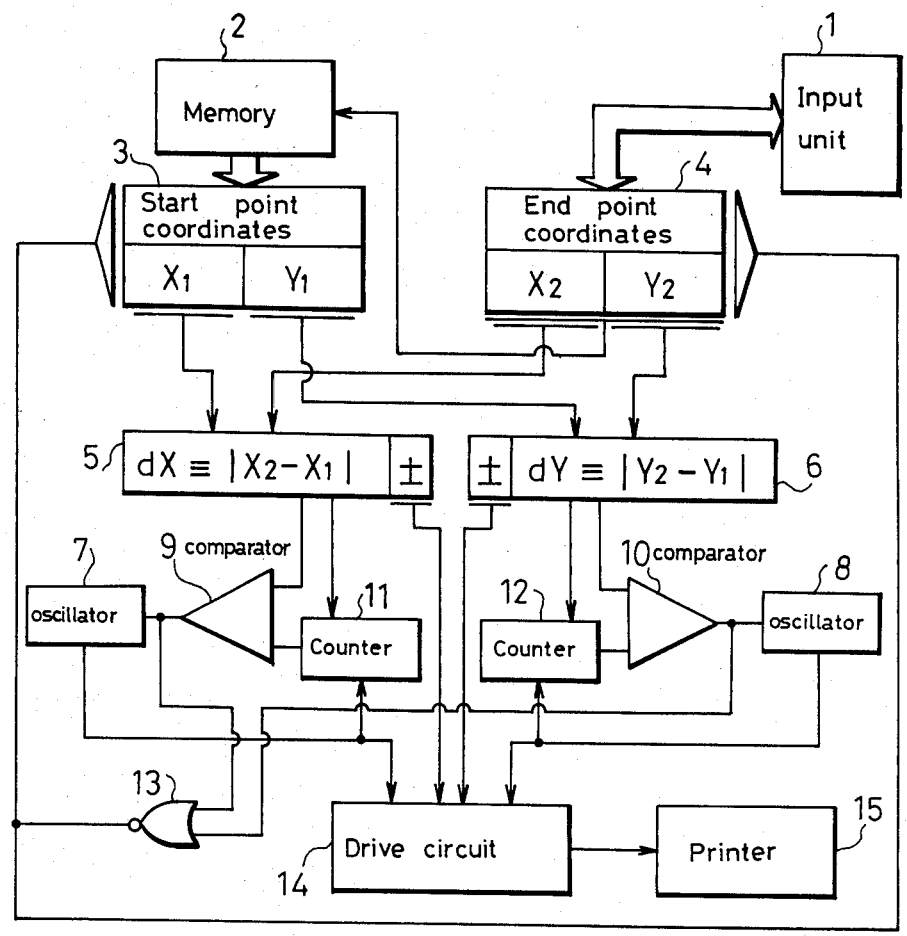
FIG. 4 is a block diagram of the printing system embodied by the inventive method of generating character patterns.
Figure 5:
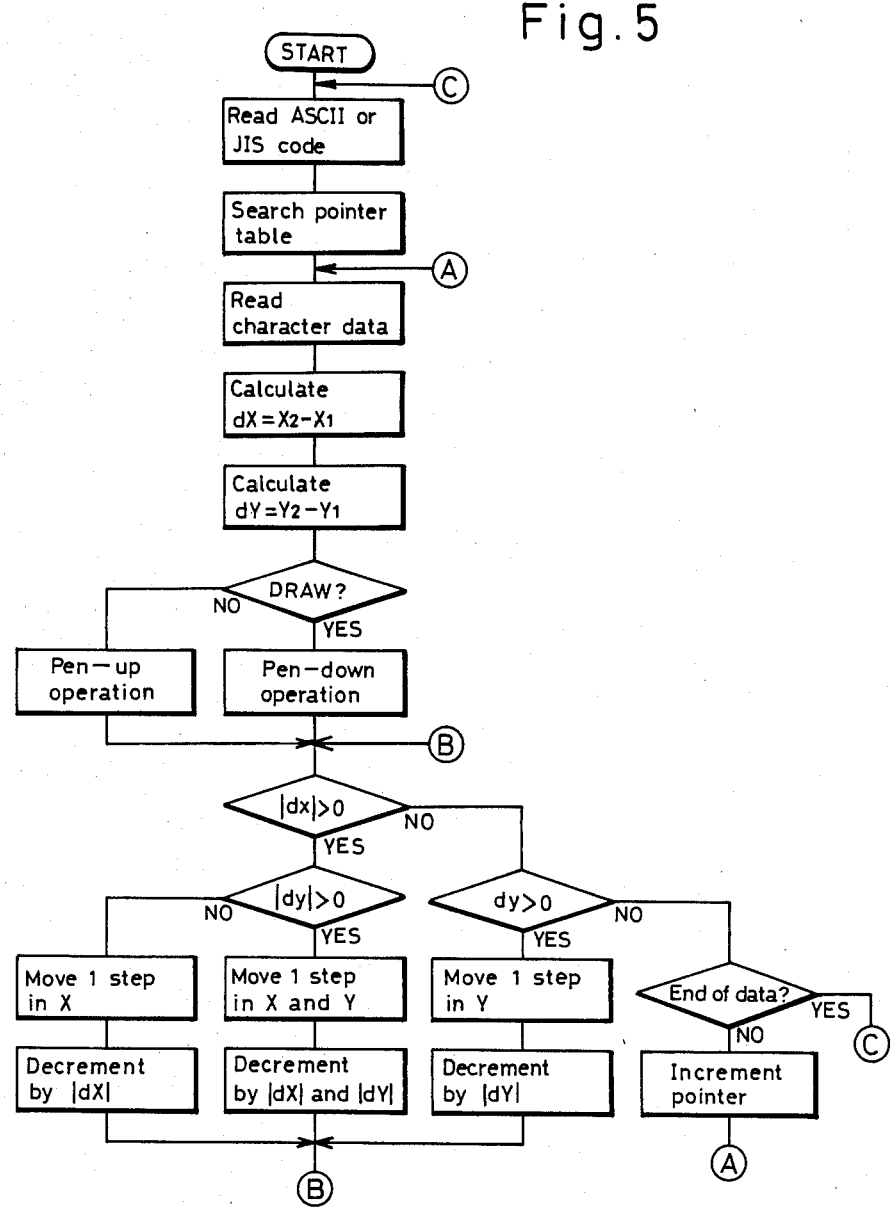
FIG. 5 is a flowchart showing the method of generating character patterns according to the present invention.

The present invention will now be described in detail with reference to FIGS. 3, 4 and 5. The arrangement of FIG. 4 includes an input unit 1, a memory 2, a start point register 3 for storing the coordinates of a start point, an end point register 4 for storing the coordinates of an end point, a first calculator 5 for calculating a coordinate on the x axis, the second calculator 6 for calculating a coordinate on the Y axis, oscillators 7 and 8 for generating pulses synchronized with each other, comparators 9 and 10, counters 11 and 12, a NOR gate 13, a drive circuit 14, and a printer 15.

The input signal which is encoded as data code ASCII or JIS code carries information corresponding to the characters to be printed, i.e., it is used to produce coordinates representing line segments constituting each character, and it is decoded by the input unit 1 and stored in the end point register 4. At this time, coordinate data stored in the memory 2 is transferred to the start point register 3.

Initially, the memory 2 is empty, and the start point register 3 is loaded with the data (0, 0). Subsequently, the contents of the end point register 4 are transferred to the memory 2.

Data $(X_1, Y_1)$ stored in the start point register 3 and data $(X_2, Y_2)$ stored in the end point register 4 are subjected to a first calculation: $dX = |X_2 - X_1|$, and a determination is made of the polarity of $(X_2 - X_1)$ by the first calculator 5, they are also subjected to a second calculation: $dY = |Y_2 - Y_1|$, and determination of the polarity of $(Y_2 - Y_1)$ by the second calculator 6.

The resultant value dX from the first calculator 5 is delivered to the comparator 9, and at the same time the counter 11 is set. The polarity signal from the first calculator 5 is given to the drive circuit 14. The comparator 9 compares dX from the first calculator 5 with the value from the counter 11, and activates the oscillator 7 so that a certain number of pulses counted by the counter 11 are supplied to the drive circuit 14 until the inputs of the comparator 9 coincide with each other. Similarly, dY calculated by the second calculator 6 is processed by the comparator 10 and oscillator 8, and a number of pulses corresponding to the value of dY are fed to the drive circuit 14. When the oscillator control signals from the comparators 9 and 10 go low to deactivate respective oscillators, the NOR gate 13 provides a high output, that clears the start point register 3 and end point register 4. At this point the start point register 3 fetches the contents of the memory 2 and the end point register 4 fetches next coordinate data from the input unit 1.

Figure 1:
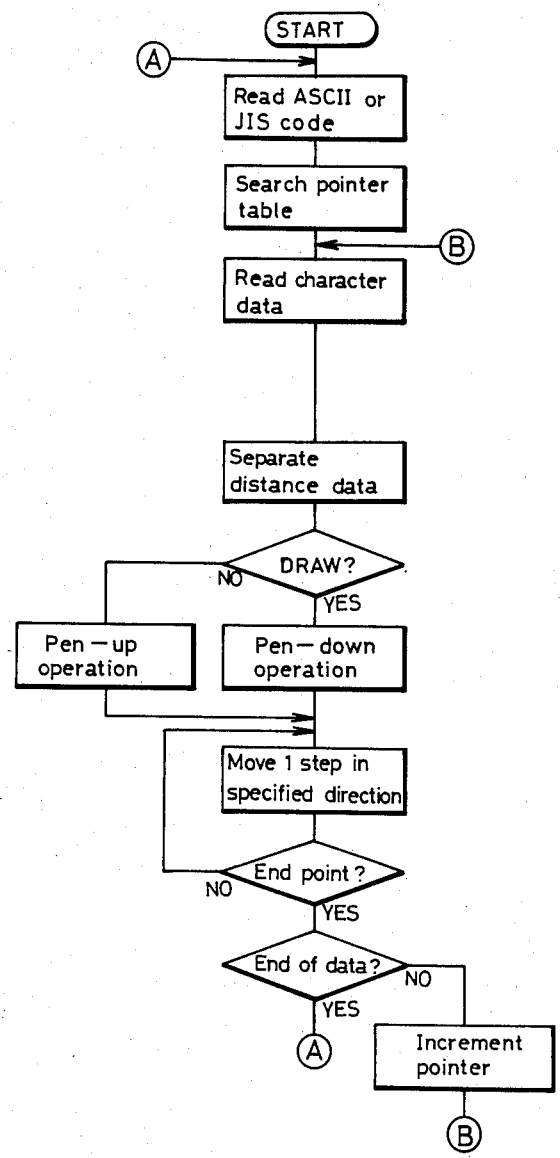
FIG. 1 is a flowchart showing the conventional method of generating character patterns.
Figure 2:
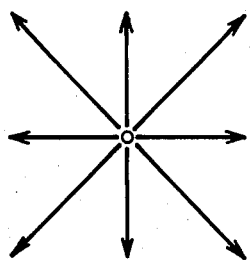
FIG. 2 is an explanatory chart showing the pen movement directions related to the present invention.
Figure 3:
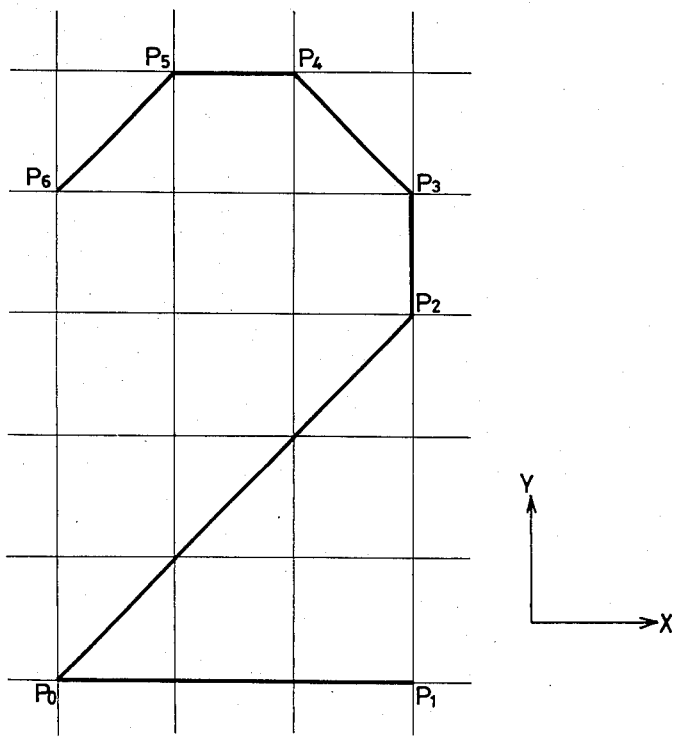
FIG. 3 is a chart showing a printed character pattern according to one embodiment of the invention.

In FIG. 3, in positioning a start point $P_0(X_0, Y_0)$, where $X_0 > 0$ and $Y_0 > 0$, the start point register 3 contains (0,0), the end point register 4 contains $(X_0, Y_0)$, the first calculator 4 provides $dX = X_0$ with determination of a positive drive polarity, and the second calculator 6 provides $dY = Y_0$ with determination of a positive drive polarity. Accordingly, the drive circuit 14 is supplied with $X_0$ pulses in the positive X direction and $Y_0$ pulses in the positive Y direction, and it moves the pen on the printer 15 by the respective number of pulses in the positive X and Y directions to complete the initial positioning.

Subsequently, for drawing the two linked lines $P_0$-$P_2$ and $P_2$-$P_3$, the coordinate data coordinates $(X_0+3,Y_0+4)$ of point $P_3$ is transferred from the input unit 1 to the end point register 4, and at the same time the start point register 3 is loaded with coordinates $(X_0,Y_0)$ of the previous end point $P_0$. In this case, $dX=3$ and $dY=4$ with the polarity being positive for both directions. In consequence, the drive circuit 14 is supplied with 3 pulses from the oscillator 7 and 4 pulses from the oscillator 8 in a synchronized relationship. Up to the third pulse, both the X and Y axes have outputs with the positive polarity, and the drive circuit 14 provides positive drive signals for the printer 15 so that the pen is moved in the composed vector direction as shown by the line $P_0P_2$ in FIG. 3. The fourth pulse is given only to the Y axis drive, and in the next step the pen is moved along the line $P_2P_3$.

Subsequently, for drawing linked lines $P_3$-$P_4$-$P_5$, data for coordinates $(X_0+1,Y_0+5)$ of point $P_5$ is loaded through the input unit 1 to the end point register 4, and calculation takes place with respect to the contents $(X_0+3,Y_0+4)$ of the start point register 3. The result is $dX=2$ and $dY=1$ with the negative polarity determined by the first calculator 5 and the positive polarity by the second calculator 6.

Further, linked lines $P_3$-$P_4$-$P_5$ can be drawn in the same way as described above. It will be seen that the line $P_5P_6$ and line $P_0P_1$ can be drawn by entering the coordinates of points $P_5$ and $P_1$, respectively, in the same way as of the conventional method.

According to the present invention, in drawing character "2" as shown in FIG. 3, coordinate data for points $P_2$ and $P_4$ are not required, and thus characters can be printed using less data than that of the conventional method.

What is claimed is:

1. A method for generating a character pattern which includes a first line of predetermined inclination linked to a second line which is horizontal or vertical with respect to a coordinate grid where the unlinked ends of said first and second lines define respectively a start point and an end point, comprising the steps of:
   providing horizontal and vertical coordinates of said start and end points to an arithmetic processor,
   determining the direction in which the first line must travel in order to approach the end point from said starting point,
   generating a direction polarity signal based on said determination,
   drawing the first line in the direction indicated by said direction polarity signal by generating horizontal and vertical drive signals responsive to said direction polarity signal, and
   stopping the respective one of said two drive signals when the respective horizontal or vertical coordinate of the first line being drawn equals a respective horizontal or vertical coordinate of the end point so that the second line having no inclination is drawn thereby.

2. The method of claim 1 further comprising the step of stopping the second of said two drive signals when the coordinates of the line being drawn equal the coordinates of the end point.

3. The method of claim 1 wherein said direction determining step comprises:
   subtracting the end point coordinates from their respective start point coordinates.

4. The method of claim 3 wherein the results of said sutraction are applied each to a respective comparator and the coordinates of the line being drawn are tracked by a pair of counters whose output are applied and to a respective one of said comparators it can be determined when either of said end point coordinates equals a respective coordinate of the line being drawn.

5. The method of claim 1 wherein said predetermined inclination is 45 degrees.

6. The method of claim 1 further comprising the step of transferring the end point coordinates in the arithmetic unit to replace the start point coordinates and inputting new start point coordinates when a new drawing cycle is desired.

* * * * *